United States Patent
Leiva Munoz et al.

(10) Patent No.: US 10,322,972 B2
(45) Date of Patent: Jun. 18, 2019

(54) ACID/BASE BINDER COMPRISING PHOSPHATE-BASED CEMENTS

(71) Applicant: SAINT-GOBAIN WEBER, Servon (FR)

(72) Inventors: Raul Leiva Munoz, Barcelona (ES); Joel Nunez Sanz, Barcelona (ES); Zahia Toutou-Melinge, Montmorency (FR); Joumana Yammine, Rosny Sous Bois (FR)

(73) Assignee: SAINT-GOBAIN WEBER, Servon (FR)

( * ) Notice: Subject to any disclaimer, the term of this patent is extended or adjusted under 35 U.S.C. 154(b) by 84 days.

(21) Appl. No.: 15/538,734

(22) PCT Filed: Dec. 21, 2015

(86) PCT No.: PCT/FR2015/053692
§ 371 (c)(1),
(2) Date: Jun. 22, 2017

(87) PCT Pub. No.: WO2016/102868
PCT Pub. Date: Jun. 30, 2016

(65) Prior Publication Data
US 2018/0186697 A1    Jul. 5, 2018

(30) Foreign Application Priority Data

Dec. 23, 2014    (FR) .................................. 14 63243

(51) Int. Cl.
*C04B 28/34*    (2006.01)

(52) U.S. Cl.
CPC ............ *C04B 28/342* (2013.01); *C04B 28/34* (2013.01); *Y02W 30/92* (2015.05); *Y02W 30/94* (2015.05)

(58) Field of Classification Search
CPC .............................. C04B 28/34; C04B 28/342
See application file for complete search history.

(56) References Cited

U.S. PATENT DOCUMENTS

| 4,786,328 A | 11/1988 | Weill et al. |
| 6,136,088 A | 10/2000 | Farrington |
| 6,733,582 B1 | 5/2004 | Bohner et al. |
| 2006/0096504 A1* | 5/2006 | Grover ................ A61L 24/0063 106/691 |
| 2014/0096704 A1* | 4/2014 | Rademan ................ C04B 2/102 106/666 |

FOREIGN PATENT DOCUMENTS

| AT | 005628 U1 | 9/2002 |
| GB | 2330137 A | 4/1999 |
| WO | 01/41824 A1 | 6/2001 |

OTHER PUBLICATIONS

International Search Report dated Jul. 1, 2016, in PCT/FR2015/053692, filed Dec. 21, 2015.

* cited by examiner

*Primary Examiner* — Anthony J Green
(74) *Attorney, Agent, or Firm* — Oblon, McClelland, Maier & Neustadt, L.L.P.

(57) ABSTRACT

The invention describes a phosphate-based inorganic binder obtained by reaction between at least one basic constituent and an acidic phosphate salt, in the presence of a retarder which is an $X^+A^-$ salt, the solubility of which in an aqueous medium, measured at 25° C., is greater than that of the acidic phosphate salt, and in which:

$X^+$ is a cation chosen from alkali metals, alkaline earth metals, zinc, aluminium and the ammonium ion, and $A^-$ is an acetate, formate, benzoate, tartrate, oleate, oxalate, bromide or iodide anion.

13 Claims, 1 Drawing Sheet

ACID/BASE BINDER COMPRISING PHOSPHATE-BASED CEMENTS

CROSS-REFERENCE TO RELATED APPLICATIONS

This application is a National Stage entry under 35 USC 371 of PCT/FR2015/053692, filed on Dec. 21, 2015 and incorporated herewith by reference, and claims priority to French Patent Application No. 1463243, filed on Dec. 23, 2014 and incorporated herewith by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATH SUBMITTED ON A COMPACT DISC

Not Applicable.

STATEMENT REGARDING PRIOR DISCLOSURES BY THE INVENTOR OR A JOINT INVENTOR.

Not Applicable.

BACKGROUND OF THE INVENTION

Field of the Invention

The present invention relates to a phosphate-based inorganic binder. This type of binder, used in construction products results from an acid/base reaction between a metal oxide and a phosphoric acid salt or derivative.

Description of the related art including information disclosed under 37 CFR 1.97 and 1.98

The majority of the basic oxides which react with phosphoric acid or one of its acid derivatives form, during mixing with water, a homogeneous mass which cures with time at ambient temperature. Mention may be made, among the most well known phosphate-based cements, of magnesium phosphate cements, which have been developed in order to compete with synthetic resins since they make it possible to obtain rapid-setting concretes with virtually immediate appearance of the desired strengths. They have in particular applications in the biomedical field and in dentistry, in the rapid repair of roads, tracks or bridges, or in the encapsulation of dangerous waste. A cement of this type, known as Ceramicrete, developed in the United States is obtained by mixing magnesium oxide or magnesia with potassium monophosphate $KH_2PO_4$. In the presence of water, the magnesia reacts with the phosphate groups under acid conditions to form an insoluble phosphate phase which cures and which has the properties of a ceramic. This phase is k-struvite of formula $MgKPO_4.6H_2O$. The reaction of the formation of this phase is very rapid and requires the use of a set-retarder. Boric acid is very often used to increase the workability time of this type of cement. However, according to European regulations and in particular the REACH Directive, boric acid is classified among substances which are toxic to reproduction. Other solutions for controlling the setting time are consequently envisaged. Papers describe the possibility of extending the setting time and thus the workability by using a specific magnesium oxide, namely magnesia calcined at high temperature, and by varying the size of the particles of the basic metal oxide involved. However, this does not make it possible to achieve setting times or workability times comparable to those which are obtained for systems based on Portland cements. Another disadvantage of this type of system is related to the high exothermicity of the reaction which takes place between the magnesia and the phosphate. The boric acid used as retarder does not make it possible to control the thermodynamics of the reaction. The final user thus has to take into account this high. exothermicity, which results in significant evaporation of the water present in the system during the preparation of the construction material.

Moreover, another disadvantage related to the excessively high reactivity and setting of these systems is the appearance of bleached regions at the surface of the cured material, which reflects a rise to the surface of unreacted salts. It is a matter of an efflorescence which gives a major aesthetic appearance defect which is not acceptable for the desired applications.

It is necessary to develop systems of phosphate-based binders, usable in mortar compositions, which exhibit longer workability times compatible with the desired applications and which do not exhibit the disadvantages described above. The present invention comes within this context.

BRIEF SUMMARY OF THE INVENTION

The present invention relates to a phosphate-based inorganic binder obtained by reaction between at least one basic constituent and an acidic phosphate salt, in the presence of a retarder which is an $X^+A^-$ salt, the solubility of which in an aqueous medium, measured at 25° C., is greater than that of the acidic phosphate salt, and in which:

$X^+$ is a cation chosen from alkali metals, alkaline earth metals, zinc aluminium and the ammonium ion, and $A^-$ is an acetate, formate, benzoate, tartrate, oxalate, oleate, bromide or iodide anion.

The presence of the retarder as described above advantageously makes it possible to control the kinetics and the exothermicity of the acid/base reaction which takes place between the basic constituent(s) present and the acid phosphate salt. The use of such a retarder makes it possible to avoid the use of boric acid or its derivatives.

DETAILED DESCRIPTION OF THE INVENTION

Figure 1:
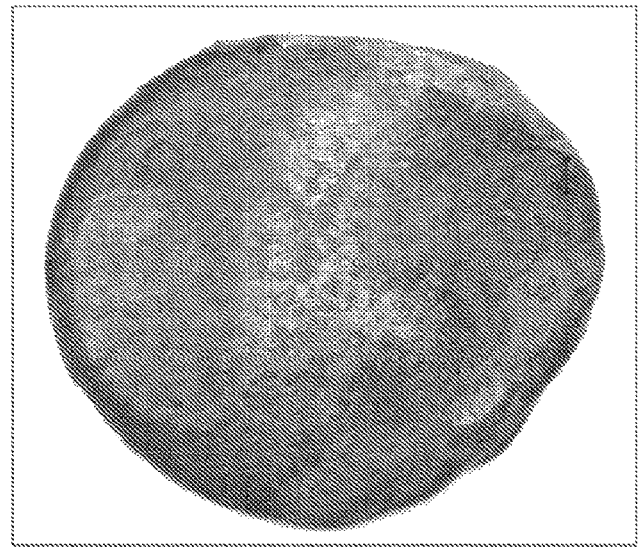
FIG. 1: A cured product obtained from Composition 6-1.

The basic constituent, which acts as base in the acid/base reaction making it possible to obtain the binder according to the invention, is chosen from metal oxides, metal hydroxides or sulphates. The metal oxides can be calcium oxide, magnesium oxide, zinc oxide, aluminium oxide and/or iron oxide. The metal oxide can also be introduced in the form of a more complex inorganic compound which comprises one or more metal oxides. Mention may be made, in this category, of silicates, metallurgical slags (for example steelworks slags or blast furnace slags), limestone, fly ash, dolomite, mica, kaolin and/or metakaolin. Metal hydroxides, such as magnesium hydroxide or calcium hydroxide, can also be used as basic constituent making it possible to form the binder according to the present invention. Sulphates, such as calcium sulphate, can also be used as basic constituent making it possible to form the binder according to the present invention. Mention may be made, among sources of calcium sulphates, of plaster, gypsum, hemihydrate and/or anhydrite. It is possible to use a mixture of these different sources of metal oxides, metal hydroxides and sulphates in order to prepare the binder according to the present invention.

Preferably, the binder according to the present invention is obtained from a mixture of at least two basic constituents, at least one among them being chosen from magnesium oxide, calcium hydroxide, magnesium hydroxide, wollastonite, alumina, metallurgical slags and calcium sulphate. The additional basic constituent can then be chosen from kaolin, metakaolin, fly ash, limestone, dolomite, calcined clays, mica and/or talc, for example.

The acidic phosphate salt participating in the acid/base reaction for the formation of the binder according to the present invention is chosen from:

potassium, calcium, magnesium, aluminium, sodium or ammonium hydrogenphosphate,
potassium, calcium, magnesium, aluminium, sodium or ammonium dihydrogenphosphate,
potassium, calcium, magnesium, aluminium, sodium or ammonium acid pyrophosphate, and/or
potassium, calcium, magnesium, aluminium, sodium or ammonium acid polyphosphate.

These acidic phosphate salts can be used alone or as a mixture. Hydrogenphosphates are salts comprising the $HPO_4^{2-}$ anion. Dihydrogenphosphates are salts comprising the $H_2PO_4^-$ anion. Acid pyrophosphates are salts derived from pyrophosphoric acid and correspond to the formulae $MH_3P_2O_7$, $M_2H_2P_2O_7$ and $M_3HP_2O_7$. Acid polyphosphates are salts derived from polyphosphoric acid and correspond to the general formula $H_{n+2}P_nO_{3n+1}$ in which n is an integer strictly greater than 2.

The acidic phosphate salt thus comprises at least one proton capable of being released during the aqueous dissolution of the binder, resulting in an acid attack which makes it possible to dissolve the metal oxide present in solution.

Preferably, the acidic phosphate salt is chosen from potassium dihydrogenphosphate $KH_2PO_4$ (MKP), ammonium dihydrogenphosphate $(NH_4)H_2PO_4$ (MAP), diammonium hydrogenphosphate $(NH_4)_2HPO_4$ (DAP), calcium dihydrogenphosphate $Ca(H_2PO_4)_2$, sodium dihydrogenphosphate $NaH_2PO_4$, aluminium hydrophosphate $AlH_3(PO_4)_2 \cdot xH_2O$, calcium metaphosphate $Ca(HPO_3)_2$, magnesium dihydrogenphosphate $Mg(H_2PO_4)_2$ or aluminium dihydrogenphosphate $Al(H_2PO_4)_3$. The preferred acidic phosphate salts are those which do not release ammonia during the reaction and are consequently chosen from potassium dihydrogenphosphate $KH_2PO_4$ (MKP), calcium dihydrogenphosphate $Ca(H_2PO_4)_2$, calcium metaphosphate $Ca(HPO_3)_2$, sodium dihydrogenphosphate $NaH_2PO_4$, aluminium hydrophosphate $AlH_3(PO_4)_2 \cdot xH_2O$, magnesium dihydrogenphosphate $Mg(H_2PO_4)_2$ or aluminium dihydrogenphosphate $Al(H_2PO_4)_3$.

The retarder used to control the reactivity of the binder according to the present invention is an ionic salt of formula $X^+A^-$ in which the cation $X^+$ is chosen from alkali metals, alkaline earth metals, zinc, aluminium and the ammonium ion and the anion $A^-$ is chosen from the acetate, formate, benzoate, tartrate, oleate, oxalate, bromide or iodide anions.

The cation could be chosen from alkali metals, alkaline earth metals, aluminium and the ammonium ion and the anion $A^-$ could be chosen from the acetate, formate, benzoate, tartrate, oleate, bromide or iodide anions. These salts are soluble in water and, in order to play their role of retarder, have to be more soluble in an aqueous medium than the acidic phosphate salt. By way of indication, the solubility in grams, in 100 ml of water at 25° C., of the salts which can be used as retarders is given in Table 1 below.

TABLE 1

|  | K | Na | Mg | Ca | $NH_4$ |
|---|---|---|---|---|---|
| Acetate | 253 | 50 | 55 | 35 | 1480 |
| Formate | 348 | 98 | 15 | 17 | 143 |
| Tartrate | 24 | 15 | <1 | <1 | 63 |
| Benzoate | 65 | 63 | — | 3 | 21 |
| Oxalate | 36 | 3 | <1 | <1 | 4 |
| Bromide | 67 | 95 | 103 | 143 | 76 |
| Iodide | 147 | 180 | 150 | 66 | 172 |

The solubility in grams, in 100 ml of water at 25° C., of acidic phosphate salts capable of being used in the reaction of the formation of binder according to the present invention is given in Table 2.

TABLE 2

|  | Solubility |
|---|---|
| Sodium hydrogenphosphate $NaH_2PO_4$ | 12 |
| Potassium hydrogenphosphate $KH_2PO_4$ | 23 |
| Ammonium hydrogenphosphate $NH_4H_2PO_4$ | 30 |
| Dipotassium hydrogenphosphate $K_2HPO_4$ | 149 |
| Diammonium hydrogenphosphate $(NH_4)_2HPO_4$ | 25 |
| Disodium hydrogenphosphate $Na_2HPO_4$ | 12 |
| Magnesium dihydrogenphosphate $Mg(H_2PO_4)_2$ | 2 |
| Aluminium dihydrogenphosphate $Al(H_2PO_4)_3$ | 2 |
| Calcium dihydrogenphosphate $Ca(H_2PO_4)_2$ | 2 |

The retarder is chosen as a function of the acidic phosphate salt used in the reaction for the formation of the binder. It is essential for the solubility to be greater than that of the acidic phosphate salt.

Preferably, the choice will be made, as retarder, of a salt, the cation of which is identical to the cation of the acidic phosphate salt involved in the reaction for the formation of the binder. The retarders for which the anions are acetates, oxalates or formates are preferred. Acetates and formates are highly preferred. These anions make it possible to obtain a longer workability time and better control of the exothermicity of the reaction. The amount of retarder represents between 1 and 10% by weight of the total amount of the constituents of the binder. Preferably, the amount of retarder is between 2 and 7% by weight.

It is possible, without departing from the context of the present invention, to use a mixture of several retarders in a binder formulation. Preferably are used as retarders a mixture of salts whose anions are chosen among acetates, formates and oxalates. As an example, mixture of acetate and oxalate or mixture of formate and oxalate could be used. In case of mixtures, the amount of retarders remains between 1 and 10% by weight, preferably between 2 and 7% by weight of the total amount of the constituents of the binder.

The binder according to the present invention can comprise, in addition to the acidic phosphate salt, another phosphate-comprising compound chosen from orthophosphate, polyphosphate or pyrophosphate salts in which the cation is chosen from sodium, potassium, calcium or the ammonium ion. Orthophosphate salts are salts derived from orthophosphoric acid comprising the $PO_4^{3-}$ anion. Pyrophosphates are salts derived from pyrophosphoric acid comprising the $P_2O_7^{4-}$ anion. Mention will in particular be made of sodium tripolyphosphate $Na_5P_3O_{10}$ (Na-TPP) or calcium pyrophosphate $Ca_2P_2O_7$. This other phosphate-comprising compound participates in particular in the retarder effect. For example, the solubility of sodium tripolyphosphate is approximately 14.5 g in 100 ml of water at 25° C. That of sodium pyrophosphate $Na_4P_2O_7$ is approximately 7 under the same conditions. If this additional phosphate-comprising compound is a base, it is important for the amounts introduced into the composition of the binder to remain, however, low in order to retain the acidic nature of the phosphorus-based constituent involved in the acid/base reaction.

The present invention also relates to a mortar or concrete composition comprising at least one binder as described above. The composition comprises aggregates and/or sands and mortar or concrete is then commonly spoken of according to the size of the aggregates. Lightweight aggregates, such as expanded clays, perlite, aerogels, vermiculite, expanded glass or expanded polystyrene, can also be used in the mortar or concrete composition according to the present invention. These compounds in particular vary the rheology, the hardness or the final appearance of the product. They are generally formed of silica, limestone and/or silica-limestone sands. The composition can also comprise components known as limestone or silica fillers and other optional additives and adjuvants conferring specific properties. Mention will be made, for example, of rheological agents, water-retaining agents, air-entraining agents, thickening agents, agents for protecting against the growth of algae and fungi, such as biocidal, fungicidal, algicidal or bactericidal agents, dispersing agents, pigments, set-accelerators and/or set-retarders, and also other agents for improving the setting, the curing or the stability of the products after application and in particular for adjusting the colour, the workability, the processability or the impermeability.

The present invention also relates to construction products, such as pointing mortars, tiling joints, tiling adhesives, screeds, floor coatings, technical mortars, insulating mortars or renderings obtained from the concrete or mortar composition defined above. These products are obtained by mixing the composition with water, the pasty composition thus formed subsequently being cured. The term of technical mortars is understood to mean special mortars formulated for specific applications, such as, for example, fixing mortars, repair mortars, masonry mortars or anchorage mortars. Prefabricated components can also be obtained from compositions comprising the binder according to the present invention. The construction products according to the invention can be prepared on site or prefabricated.

The products thus obtained have workability times compatible with the desired applications, since the product remains usable after mixing for a longer time than when the composition does not comprise the retarder. Furthermore, the products obtained from the mortar or concrete compositions according to the present invention do not comprise aesthetic appearance defects due to efflorescence phenomena.

The examples below illustrate the invention without limiting the scope thereof.

In the following examples, the practical duration of use is measured for different binder compositions. This practical duration of use corresponds to the maximum period of time after the preparation of the binder, that is to say after the mixing of the different pulverulent constituents with the mixing water, during which the wet paste thus obtained can be used. The practical duration of use is determined by measuring the period of time which passes between the moment when the product is prepared with the desired paste consistency and the moment when the viscosity of the paste has increased so that the product is no longer sufficiently fluid to be applied. The practical duration of use is correlated with the time for initial setting due to the curing of the paste, the setting time being measured according to the Vicat test according to French Standard NF EN 196-3.

The workability time is defined as the period of time during which a fresh paste retains a sufficiently low viscosity to be easily applied with good handleability.

For all the examples below, the pulverulent products are mixed with one another before adding the mixing water in order to prepare the fresh paste. The amount of water which is added and given as % by weight of water can vary as a function of the application and of the handleability desired so as to obtain the desired consistency of the paste. The consistency of the fresh paste is determined on a vibrating table according to French Standard NF EN 1015-3. The pulverulent mixture is mixed with the water so as to obtain a homogeneous paste. The fresh paste is poured into a given mould on the tray of a defined vibrating table. After removing the mould, the fresh paste is subjected to a given number of vertical shaking actions. The diameter of the fresh paste circle is measured. Identical diameters make it possible to ascertain that the consistencies of the pastes are comparable.

Different binder compositions according to the present invention are prepared. The measurements of practical duration of use are carried out on identical compositions, with or without retarders.

The binder compositions are prepared by mixing the basic constituent(s) with the acidic phosphate salt in the presence of the salt used as retarder.

The content of each of the constituents is given as percentage by weight, the total sum of the amounts of pulverulent products having a value of 100%. The mixing water which is added is shown for each example and corresponds to the amount of water necessary in order to obtain the same paste consistency. The water content shown in each example corresponds to the amount which is added to a mixture which comprises 100% of pulverulent products.

The examples below show that the practical duration of application of the paste obtained by mixing the binder according to the present invention with water is increased in the presence of the retarder. The binder is obtained by reaction between one or more basic constituent(s) and an acidic phosphate salt and is thus by nature extremely reactive. Consequently, mortar compositions prepared from this binder, which can comprise other components, such as sands or fillers, which can also participate in the increase in the practical duration of application, will make it possible to have practical durations of application which are further improved.

EXAMPLE 1

A mixture consisting of 50% by weight of lightly calcined magnesium oxide (ISMAF) and 50% by weight of potassium dihydrogenphosphate $KH_2PO_4$ (Prayon) is prepared. The water is added to the pulverulent mixture thus obtained in an amount representing 20% by weight, with respect to the total amount of pulverulent constituents. The practical duration of use measured for the paste is 0.5 min. The same composition is prepared by adding 3% by weight of potassium acetate (from Sigma Aldrich) as retarder. The amount of water added is also 20% by weight. The practical duration of use measured for the paste comprising the retarder is then 7 min.

EXAMPLE 2

A mixture consisting of 50% by weight of wollastonite $CaSiO_3$ (Nordkalk) and 50% by weight of calcium dihydrogenphosphate monohydrate $Ca(H_2PO_4)_2 \cdot H_2O$ (Budenheim) is prepared. The water is added to the pulverulent mixture thus obtained in an amount representing 50% by weight, with respect to the total amount of pulverulent constituents. The practical duration of use measured for this paste is 0.2 min. The same composition is prepared by adding 3% by weight of calcium acetate (from Sigma Aldrich) as retarder. The amount of water added is also 50% by weight. The practical duration of use measured for the paste comprising the retarder is then 3 min.

EXAMPLE 3

Three different mixtures of magnesium oxide strongly calcined at high temperature (1500° C.) and sintered (Grecian Magnesite) and of potassium dihydrogenphosphate $KH_2PO_4$ (Prayon) are prepared while varying the MgO:MKP ratio by weight.

Composition 3-1 corresponds to 25% by weight of MgO and 75% by weight of MKP. The amount of water added is 20% by weight, with respect to the total sum of the pulverulent compounds.

Composition 3-2 corresponds to 50% by weight of MgO and 50% by weight of MKP. The amount of water added is 21% by weight, with respect to the total sum of the pulverulent compounds.

Composition 3-3 corresponds to 75% by weight of MgO and 25% by weight of MKP. The amount of water added is 22% by weight, with respect to the total sum of the pulverulent compounds.

The practical durations of application of these three pastes are measured and are respectively 17 min for the paste obtained from Composition 3-1, 5 min for the paste obtained from Composition 3-2 and 4 min for the paste obtained from Composition 3-3.

3% by weight of potassium acetate (from Sigma Aldrich) is added to each of Compositions 3-1, 3-2 and 3-3, while maintaining the MgO:MKP ratios, which are respectively 25/75, 50/50 and 75/25. The mixing water is added in the same proportions. The practical durations of use of the pastes obtained from Compositions 3-1, 3-2 and 3-3 to which the retarder has been added were measured and respectively have the values of 80 min for the paste obtained from Composition 3-1, 50 min for the paste obtained from Composition 3-2 and 18 min for the paste obtained from Composition 3-3.

EXAMPLE 4

Several compositions with an MgO:MKP ratio by weight identical to that of Composition 3-3 are prepared from the same starting materials.

Composition 4-1 corresponds to 75% by weight of MgO strongly calcined at high temperature and 25% by weight of MKP.

Composition 4-2 comprises 37.5% by weight of MgO strongly calcined at high temperature, 12.5% by weight of MKP and 50% by weight of silica sand.

Compositions 4-3 comprise 72.8% by weight of MgO strongly calcined at high temperature, 24.2% by weight of MKP and 3% by weight of a retarder. Different retarders are tested: potassium acetate from Sigma Aldrich (Composition 4-3a), potassium formate from VWR (Composition 4-3b) and, by way of comparison, 99,8% pure boric acid from Panreac (Composition 4-3c). Some mixtures of retarders have also been tested: the composition 4-3d comprises a mixture of 2,40% by weight of potassium formate from VWR and of 0,6% by weight of potassium oxalate from VWR. The composition 4-3e comprises a mixture of 2,40% by weight of potassium acetate from Sigma Aldrich and of 0,6% by weight of potassium oxalate from VWR. Other retarders as zinc formate from Alfa Aesar (composition 4-3f) and sodium formate from VWR (composition 4-3g) are used, in an amount of 3% by weight. The amount of water added for the mixing is 22% by weight, with respect to the total sum of the pulverulent compounds.

The practical durations of use of the different compositions are measured and are given in Table 3 below:

TABLE 3

| | Practical duration of use (min) |
|---|---|
| Composition 4-1 | 4 |
| Composition 4-2 | 10 |
| Composition 4-3a<br>3% by weight of potassium acetate | 18 |
| Composition 4-3b<br>3% by weight of potassium formate | 7 |
| Composition 4-3c<br>3% by weight of boric acid | 12 |
| Composition 4-3d<br>2.4% by weight of potassium formate<br>and 0.6% by weight of potassium oxalate | 8 |
| Composition 4-3e<br>2.4% by weight of potassium acetate<br>and 0.6% byweight of potassium oxalate | 30 |
| Composition 4-3f<br>3% by weight of zinc formate | 15 |
| Composition 4-3g<br>3% by weight of sodium formate | 13 |

It is found that the silica sand participates in the retarding effect but less effectively than the retarders according to the present invention, which make it possible to obtain, for some, a greater effect than that which was obtained with retarders, such as borax, used in the prior art.

EXAMPLE 5

In the same way, different compositions comprising an MgO:MKP ratio of 25/75 are prepared as in Example 4.

Composition 5-1 corresponds to 25% by weight of MgO strongly calcined at high temperature and 75% by weight of MKP.

Composition 5-2 comprises 12.5% by weight of MgO strongly calcined at high temperature, 37.5% by weight of MKP and 50% by weight of silica sand.

Compositions 5-3 comprise 24.2% by weight of MgO strongly calcined at high temperature, 72.8% by weight of MKP and 3% by weight of a retarder. Different retarding agents are tested: potassium acetate from Sigma Aldrich (Composition 5-3a), potassium oxalate from VWR (Composition 5-3b) and, by way of comparison, 99,8% pure boric acid from Panreac (Composition 5-3c). The amount of water added for the mixing is 22% by weight, with respect to the total sum of the pulverulent compounds.

The practical durations of use of the different compositions are measured and are given in Table 4 below:

TABLE 4

|  | Composition 5-1 | Composition 5-2 | Composition 5-3a | Composition 5-3b | Composition 5-3c |
|---|---|---|---|---|---|
| Practical duration of use (min) | 17 | 25 | 80 | 40 | 57 |

EXAMPLE 6

A mixture (Composition 6-1) is prepared which consists of:
- 15.8% by weight of magnesia strongly calcined at high temperature (1500° C.) and sintered (Grecian Magnesite)
- 3% by weight of wollastonite $CaSiO_3$ (Nordkalk)
- 1% by weight of calcined alumina $Al_2O_3$ (RBH)
- 79.2% by weight of potassium dihydrogenphosphate $KH_2PO_4$ (Prayon)
- 1% by weight of an inorganic pigment (Oximed 12A Europigments) which makes it possible to colour the sample and to visually reveal the presence of efflorescence. The amount of water added is 17% by weight, with respect to the total sum of the pulverulent compounds.

The practical duration of application of this paste is 13 min.

The same paste composition is prepared while adding 3% by weight of potassium acetate from Sigma Aldrich (Composition 6-2). The practical duration of application of this paste is increased and has a value of 40 min.

Figure 2:
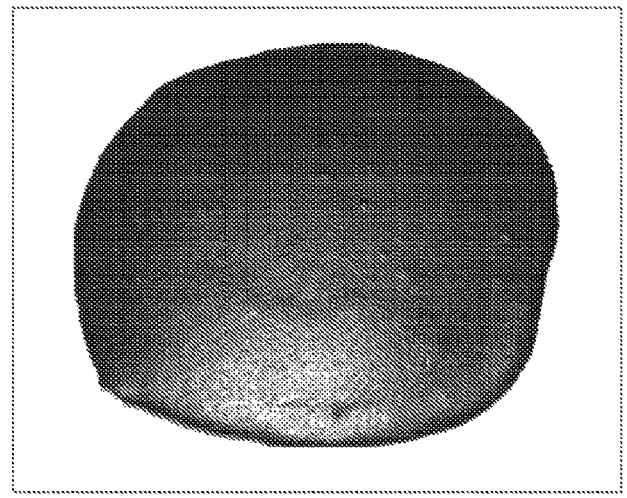
FIG. 2: A cured product obtained from Composition 6-2.

FIGS. 1 and 2 represent the cured products obtained from these Compositions 6-1 and 6-2: the presence of white regions in FIG. 1, reflecting the efflorescence phenomena, is noticed. In the presence of potassium acetate, this efflorescence phenomenon is controlled, the colour of the sample being more uniform.

EXAMPLE 7

A mixture comprising 52.6% by weight of lightly calcined magnesium oxide (ISMAF), 42.1% by weight of potassium dihydrogenphosphate $KH_2PO_4$ (Prayon) and 5.3% by weight of retarder, of different types, some being not in accordance with the invention and thus given by way of comparison, is prepared. The amount of water added is 37% by weight, with respect to the total amount of the pulverulent constituents. The practical durations of use of the different pastes obtained are measured and are shown in Table 5 below:

TABLE 5

| Retarder | Practical duration of use (min) |
|---|---|
| Potassium formate (VWR) | 8 |
| Dipotassium tartrate (Sigma Aldrich) | 2 |

TABLE 5-continued

| Retarder | Practical duration of use (min) |
|---|---|
| Potassium benzoate (Sigma Aldrich) | 4 |
| Potassium bromide (Panreac) | 5 |
| Potassium iodide (Panreac) | 4 |
| Potassium oleate (Panreac) | 1 |
| Calcium citrate (Sigma Aldrich) | 0.5 |
| 99.8% pure Boric acid (Panreac) | 11 |
| Potassium acetate (Sigma Aldrich) | 12 |

By way of comparison, the same formulation without any retarder has a practical duration of application of 0.3 min.

EXAMPLE 7

A mortar composition is prepared by mixing the following different constituents:
- 40% by weight of magnesia strongly calcined at high temperature (1500° C.) and sintered (Grecian Magnesite)
- 40% by weight of potassium dihydrogenphosphate $KH_2PO_4$ (Prayon)
- 20% by weight of silica sand.

The amount of water added is 20% by weight, with respect to the total sum of the pulverulent compounds.

The practical duration of application of this paste is 4.5 min.

The same paste composition is prepared while adding 3% by weight of potassium acetate (Sigma Aldrich). The practical duration of application of this paste is increased and has a value of 32 min.

The invention claimed is:

1. A mortar or concrete composition, comprising a phosphate-based inorganic binder obtained by reaction between at least one basic constituent and an acidic phosphate salt, in the presence of a retarder which is an $X^+A^-$ salt, wherein:
   the solubility of the retarder in an aqueous medium, measured at 25° C. is greater than that of the acidic phosphate salt;
   $X^+$ is at least one cation selected from the group consisting of alkali metals, alkaline earth metals, zinc, aluminium, and an ammonium ion;
   $A^-$ is an acetate, formate, benzoate, tartrate, oleate, or oxalate anion; and
   the cation $X^+$ of the retarder is identical to the cation of the acidic phosphate salt.

2. The mortar or concrete composition according to claim 1, wherein the basic constituent is at least one selected from the group consisting of metal oxides, metal hydroxides, and sulphates.

3. The mortar or concrete composition according to claim 1, wherein the basic constituent is at least one selected from the group consisting of iron oxide, aluminium oxide, zinc oxide, magnesium oxide, calcium oxide, silicates, sources of calcium sulphate, and metallurgical slags.

4. The mortar or concrete composition according to claim 1, wherein the basic constituent is a mixture of at least two basic constituents, comprising at least one selected from the group consisting of magnesium oxide, calcium hydroxide, magnesium hydroxide, wollastonite, alumina, metallurgical slags, and calcium sulphate.

5. The mortar or concrete composition according to claim 4, wherein the mixture of at least two basic constituents comprises at least one additional basic constituent selected from the group consisting of kaolin, metakaolin, calcined clays, fly ash, limestone, dolomite, mica, and talc.

6. The mortar or concrete composition according to claim 1, wherein the acidic phosphate salt is at least one selected from the group consisting of potassium hydrogenphosphate, calcium hydrogenphosphate, magnesium hydrogenphosphate, aluminium hydrogenphosphate, sodium hydrogenphosphate, ammonium hydrogenphosphate, potassium dihydrogenphosphate, calcium dihydrogenphosphate, magnesium dihydrogenphosphate, aluminium dihydrogenphosphate, sodium dihydrogenphosphate, ammonium dihydrogenphosphate, potassium pyrophosphate, calcium pyrophosphate, magnesium pyrophosphate, aluminium pyrophosphate, sodium pyrophosphate, ammonium acid pyrophosphate, potassium polyphosphate, calcium polyphosphate, magnesium polyphosphate, aluminium polyphosphate, sodium polyphosphate, and ammonium acid polyphosphate, alone or as a mixture.

7. The mortar or concrete composition according to claim 1, wherein the cation $X^+$ of the retarder is at least one selected from the group consisting of potassium, calcium, magnesium, sodium, zinc, aluminium, and an ammonium ion.

8. The mortar or concrete composition according to claim 1, wherein the anion $A^-$ of the retarder is an acetate ion or a formate ion.

9. The mortar or concrete composition according to claim 1, wherein the retarder is a mixture of salts having anions selected from the group consisting of acetates, formates, and oxalates.

10. The mortar or concrete composition according to claim 1, wherein a content of retarder in the binder is between 1 and 10% by weight of a total amount of constituents of the binder.

11. The mortar or concrete composition according to claim 1, wherein the binder further comprises at least one other phosphate-comprising compound selected from the group consisting of orthophosphate salts, polyphosphate salts, and pyrophosphate salts, and wherein the at least one other phosphate-comprising compound comprises, as a cation, at least one selected from the group consisting of sodium, potassium, calcium, and an ammonium ion.

12. The mortar or concrete composition according to claim 1, wherein the acidic phosphate salt is at least one selected from the group consisting of calcium hydrogenphosphate, magnesium hydrogenphosphate, aluminium hydrogenphosphate, sodium hydrogenphosphate, ammonium hydrogenphosphate, calcium dihydrogenphosphate, aluminium dihydrogenphosphate, sodium dihydrogenphosphate, ammonium dihydrogenphosphate, calcium pyrophosphate, magnesium pyrophosphate, aluminium pyrophosphate, ammonium acid pyrophosphate, potassium polyphosphate, calcium polyphosphate, magnesium polyphosphate, aluminium polyphosphate, sodium polyphosphate, and ammonium acid polyphosphate, alone or as a mixture.

13. A construction product, prepared on site or prefabricated, obtained from the mortar or concrete composition according to claim 1.

* * * * *